Nov. 27, 1928.  1,692,829

N. E. GOODACTIVE

CONE BELT SHIFTER

Filed Nov. 3, 1922      3 Sheets-Sheet 1

Nov. 27, 1928.                                                                    1,692,829
N. E. GOODACTIVE
CONE BELT SHIFTER
Filed Nov. 3, 1922                3 Sheets-Sheet 3
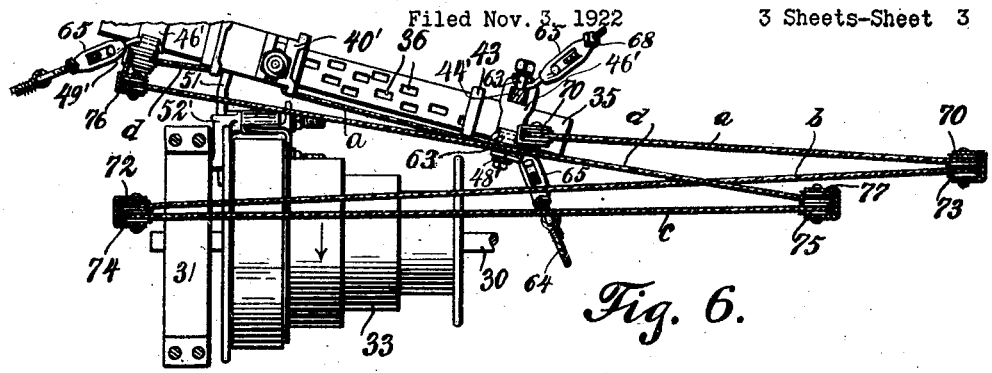
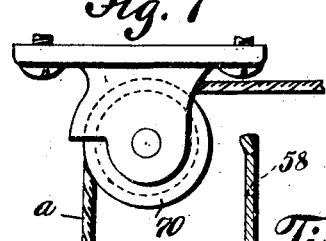
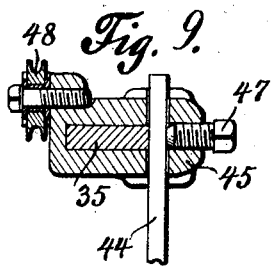
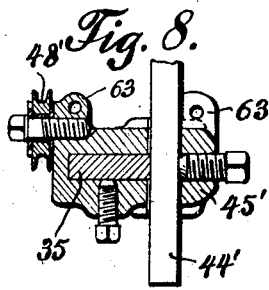
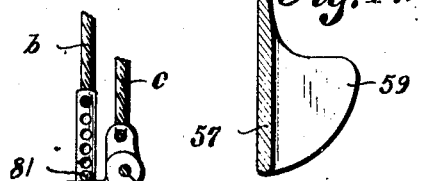
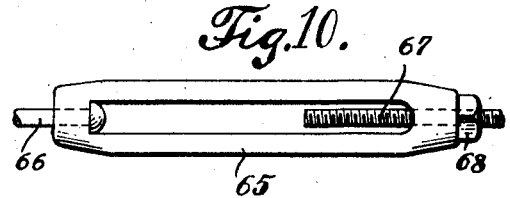
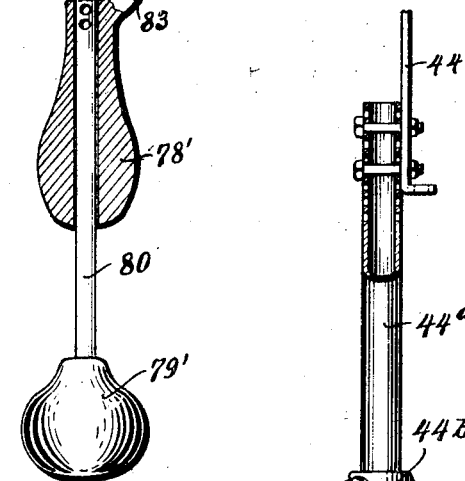
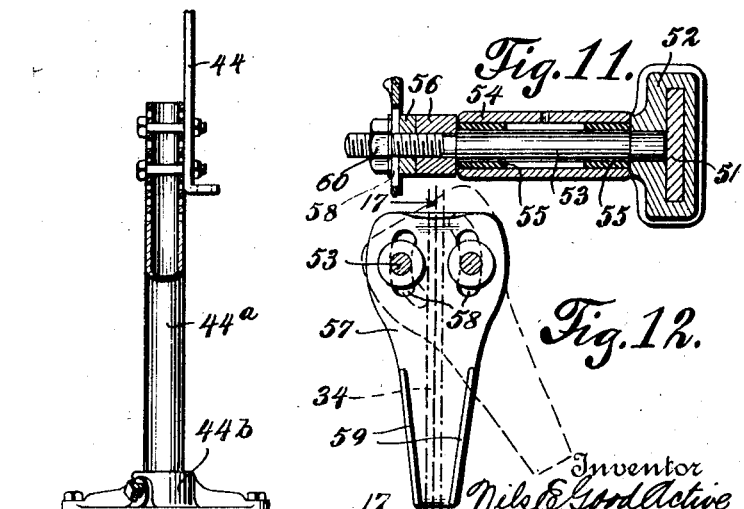
Inventor
Nils E. GoodActive
By his Attorney
Geo. L. Beeler Patented Nov. 27, 1928.

1,692,829

UNITED STATES PATENT OFFICE.

NILS E. GOOD ACTIVE, OF NEW YORK, N. Y.

CONE BELT SHIFTER.

Application filed November 3, 1922. Serial No. 598,809.

This invention relates to power transmitting devices and has particular reference to belt shifters calculated especially for use on cone or stepped pulleys such as are commonly used in connection with machine shop lathes, drill presses and other analogous machines, this invention being broadly of the same general nature as the one covered by Letters Patent of the United States, No. 1,319,014, issued to me on the 14th day of October, 1919, and that covered by my pending application for cone belt shifting mechanism, filed March 2nd, 1921, Serial No. 448,974.

Among the objects of this present improvement is to provide a cone belt shifter of practically universal application to various sizes and types of metal working machines; to provide improved hand operated means for shifting the belts in a peculiarly positive and reliable manner and within easy reach of the operator as he is stationed adjacent to the machine in the position ordinarily occupied during the control of the machine, to provide improved facilities for leading or guiding the belt at either its upper or lower loop while being shifted from a smaller to a larger step, thereby preventing twisting, distortion, or other condition which with other shifters has a tendency to either destroy the belt or interfere with the prompt and easy shifting thereof in the manner intended; to provide improved belt guides, especially adapted for use in connection with cone belt shifters; to provide a novel and improved guide bar mechanism along which the belt loops or guides are actuated and whereon said guides are held stationary automatically while the belt is in normal operating position and condition; to provide improved cord or cable guides for the manually operated shifting devices, over which the cords or cables may be operated conveniently and easily from any suitable position of the operator or distance from the belt mechanism, and a number of other purposes and objects which will be pointed out more particularly hereinafter.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Fig. 6 is a plan view of the upper pulley with parts in section on the line 6—6 of Fig. 1.

Fig. 7 is a side elevation of one of the guide pulleys and its housing attached to the ceiling or other overhead support.

Fig. 8 is a sectional detail of one of the combination guide bar clamps and cable guides associated with one of the ceiling brackets.

Fig. 9 is a similar view of one of the lower guide bar combination clamps and cable guides.

Fig. 10 is a detail view of one of the guy adjusters for supporting the upper shifter guide bar.

Fig. 11 is a sectional detail on the line 11—11 of Fig. 2 showing especially the construction of the belt guide or loop.

Fig. 12 is an inside elevation of the belt leader and showing its lateral adjustability.

Fig. 13 is a detail view of one of the combination hand grips for successive operation.

Fig. 14 is a modification of a hand grip device adapted for larger machines.

Fig. 15 is a vertical sectional detail of another form of hand mechanism for effecting successive or step by step shifting of the different parts of the belt as the result of a single continuous pull.

Fig. 16 is a view of the same showing a changed position of some of the parts.

Fig. 17 is a vertical sectional view of one of the belt leaders on the line 17—17 of Fig. 12.

Fig. 18 is a detail indicating a modified form of means for connecting a guide bar bracket to a different type of machine.

Figure 1:
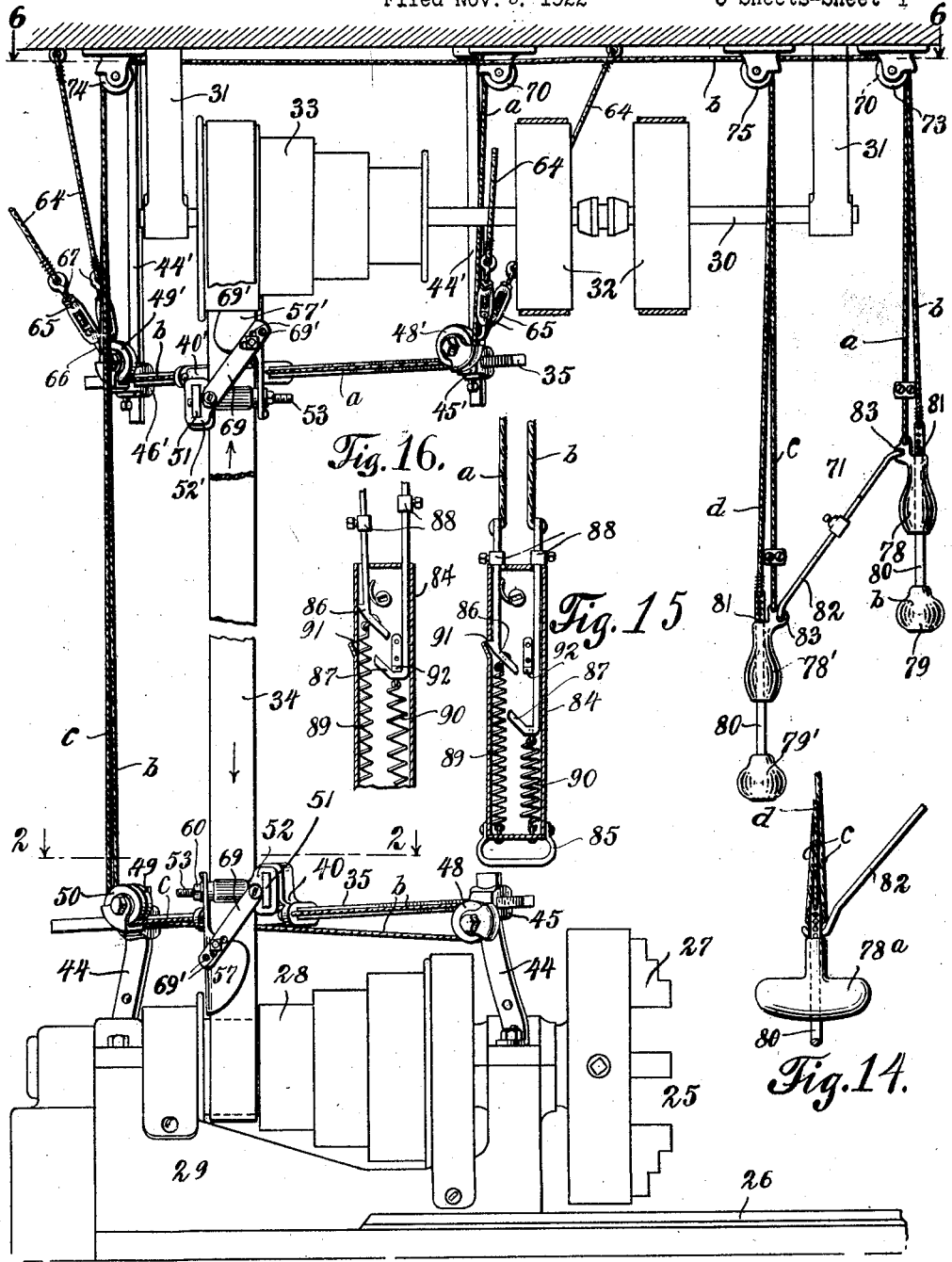
Figure 1 is a front elevation of a preferred embodiment of this invention showing the belt operating over the highest speed step of the overhead pulley and so in position to be shifted to the right.

Referring now more specifically to the drawings I show at 25 a conventional lathe comprising a bed 26 and a chuck 27 to the shaft of which is fixed a cone pulley 28 journaled in a head stock 29. Shown above the lathe and at any desired position either directly over or forward or rearward therefrom, is a power shaft 30 journaled in hangers 31 and having mounted thereon any suitably arranged tight and loose pulleys 32 and an upper cone pulley 33, the steps of which are arranged reversely with respect to the corresponding steps of the lower cone pulley 28 and between which operates a shiftable belt 34.

Figures 3, 4:
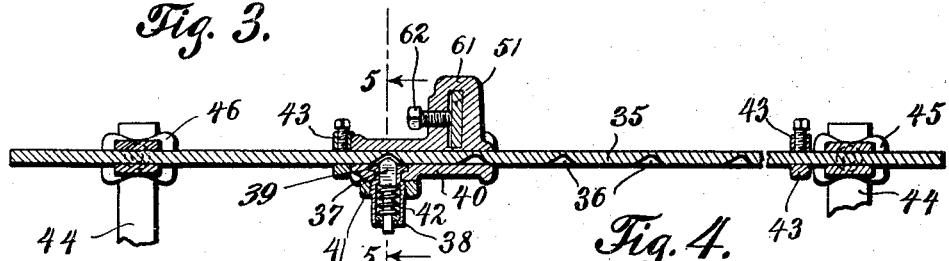
Fig. 3 is a longitudinal sectional detail on the line 3—3 of Fig. 2 but on an enlarged scale.
Fig. 4 is a bottom plan view of a portion of the guide bar shown in Fig. 3.
Figure 5:
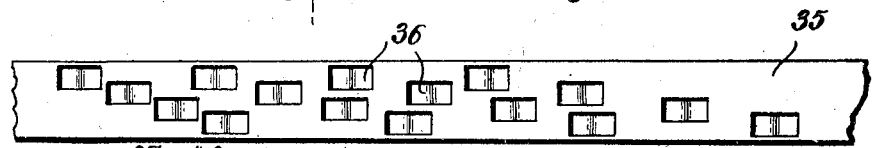
Fig. 5 is a vertical transverse section through the guide bar and belt guide slide on the line 5—5 of Fig. 3.

Arranged adjacent to the lower pulley 28 and preferably above it is a guide bar 35, illustrated in detail in Figs. 3 and 4, the same being a straight piece of metal of uniform cross section except for the provision of one or more series of notches 36 formed in one face thereof, preferably the lower face for the lower bar. As shown in Fig. 4 I provide four of such series of notches, the notches of each series being equally spaced and corresponding to the lateral spacing or intervals between centers of adjacent steps of a cone pulley of standard size or construction. The notches of each series are arranged at a uniform distance from the edges of the bar. These notches are preferably all of what might be termed a flat V-shape having flat sides for cooperation with the similarly formed point of a spring pressed plunger 37 mounted in a cup or housing 38 having a T-head 39 adjustable laterally or transversely of the slide 40 and adapted to be locked in adjusted position by means of a lock nut 41. Thus it will be seen from Figs. 3 and 5 that the plunger 37, according to the position it occupies with respect to the edges of the guide bar 35, will act in succession with any one series of notches 36, and when so adjusted the slide may be moved from one notch to another and will be automatically held in such adjusted position by virtue of the spring 42 acting normally upward on the plunger. This plunger, because of its V point, is made rectangular in cross section to prevent its rotation. See Fig. 3. Thus the bar 35, shown made with a plurality of series of notches 36, if adapted for universal application to machines whose pulleys are of different sizes or have different intervals. It is preferred however to employ stop collars 43 on the bar 35 to positively limit the throw of the slide in either direction. The bar 35 is fixed or supported in suitable position, especially with respect to and above the pulley 28, by means of brackets 44, each being shown with a horizontal foot for attachment to the head stock structure. In the practice of this invention the brackets 44 are made as shown of flat bar metal and so are bendable by the use of tools such as two monkey wrenches so as to adapt the free end where the clamp 45 is secured to any desired position according to the make, size, or type of lathes or other machine to which the shifter is being fitted. As indicated by the drawings the lower or foot end of each bracket 44 usually is secured in place by means of the lag screw or bolt which is employed in the assemblage of the machine and for this reason no special drilling or tapping of the machine is necessary to apply the bracket. In practice the bracket is secured in the manner just described and shown, and after it is secured rigidly and permanently in position the machinist bends or shapes the bracket to bring the clamp 45 to the desired position. In other belt shifter constructions it is common for the parts corresponding to the shifter guide bar 35 to be connected by means of adjustable joints and it is not infrequent, therefore, for such joints to become loose and for the parts to become disturbed in their adjustment and so become very troublesome. In this construction, however, when the bracket is once fixed in position and bent to proper shape the adjustment of the parts is made practical and complete once for all. For use in connection with a shaper, radial drill, or such machines, either bracket 44 may be attached to a standard 44$^a$ suitably mounted upon any convenient base 44$^b$, as in Fig. 18. The position of the guide bar, in plan view, is over the pulley and approximately parallel to the "belt-on" side of the pulley, and the end of the bar adjacent to the largest pulley step is elevated somewhat above the other end thereof, the desired elevation being determined by the adjustment of the clamps 45 and 46 vertically along the brackets 44 where they are locked by suitable means such as set screws 47 bearing laterally against the sides of the brackets. As shown in Fig. 9 the guide bar 35 is adjusted longitudinally with respect to the clamps and is gripped in place coincident with the setting of the screw 47. The clamp 35 carries a guide roller or pulley 48 mounted on a horizontal pivot, and the clamp 46 carries two of such pulleys 49 and 50 mounted on a single pivot.

Figure 2:
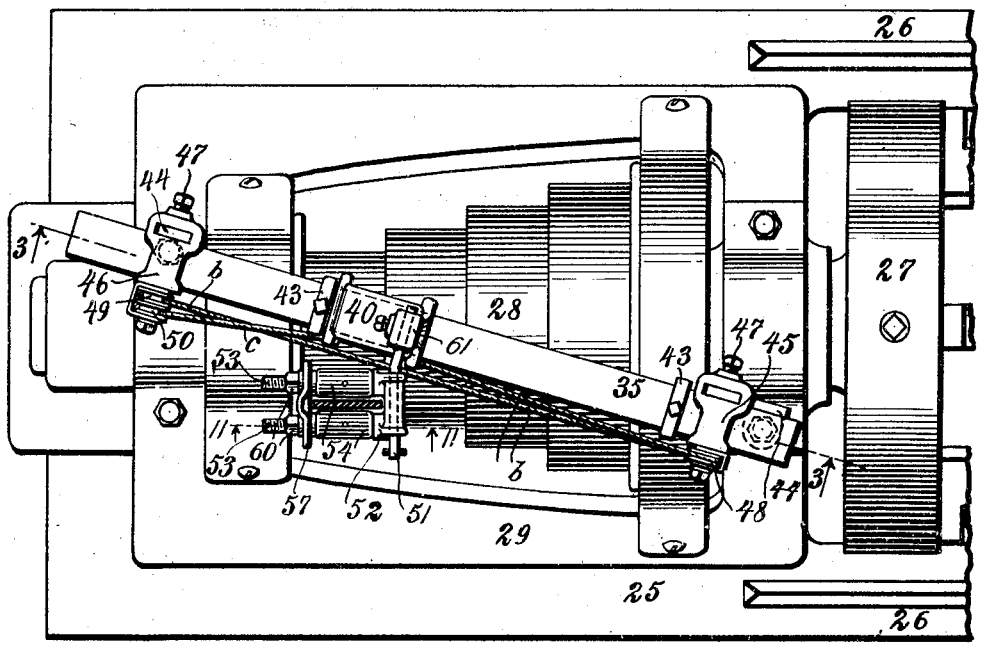
Fig. 2 is a plan view of the lower pulley with parts in section on the line 2—2 of Fig. 1.

The slide 40 carries an arm 51 which extends laterally therefrom and is so bent or shaped as to lie in a vertical plane perpendicular to the axis of the pulley or plane of the belt and upon which arm is freely slidably mounted a frame or body portion 52 of the lower belt guide or loop. See Figs. 2 and 11.

From this body 52 project in a substantially horizontal plane a pair of spaced pintles 53 upon each of which is mounted a roller 54 through any suitable anti-friction or self lubricating bearing sleeves 55 or their equivalent. The belt 34 is guided freely between said rollers, and the pintles 53 are long enough to accommodate the widest belts, and for the belts wider than the minimum, spacers 56 are employed adjacent to the ends of the rollers, and against said spacers is hung what I term the belt leader 57, the preferred form of which is shown best in Figs. 12 and 17. The leader comprises a substantially flat body having arranged in the same plane at its upper portion a pair of concentric arc shaped slots 58 through which the pintles 53 project. The point or active portion of the leader is adjusted so as to extend in a direction approximately parallel to the belt irrespective of the position of the overhead pulley with respect to the machine or lathe. The dash lines in Fig. 12 indicate how this leader may be adjusted through the slots 58 so that the belt will be lead or guided freely along the same between the belt embracing lips 59. After the leader is adjusted it is clamped in position by the lock units 60 on the ends of the pintles 53. The arm 51 may be connected in any suitable manner to the slide 40 but as shown herein it is clamped in a housing 61 by means of a set screw 62 so as to be adjustable laterally of the bar 35.

For the upper belt shifter unit adjacent to the pulley 33 I provide a guide bar 35 which may be similar to the one already described and having notches 36 in its upper face, the arrangement of the notches being in series the same as shown in Fig. 4. It will be understood that these bars may be manufactured of any suitable length and cut off if desired when assembled in connection with any machines. The upper guide bar is suitably suspended or supported from the ceiling or other overhead support as by means of brackets 44', the same having adjustable fixed relation to the guide bar through a pair of clamps 45' and 46', see Fig. 8. The bracket 45' carries a grooved pulley 48' and the other clamp 46' carries a similar pulley 49'. These upper clamps are additionally provided with ears 63 with which co-operate any suitably arranged guys 64 leading to distant points along the ceiling or other overhead support and each provided preferably with a turn buckle 65 of a form shown in Fig. 10 and comprising one smooth end and one threaded end for co-operation with the smooth end and one threaded end for co-operation with the smooth headed rod or hook 66 and the threaded rod 67, respectively. The desired tightness of these guides is effected by turning the turn buckles and the same is secured by lock nuts 68. The brackets 44' obviously may be bent laterally as may be desired to approximate the position of the guide bar 35 below the pulley 33, and the final or delicate adjustment may be determined by actuation of the turn buckles.

A belt guide is provided for the upper loop of the belt, embracing the same at the rear or "belt-on" side of the pulley. This belt guide includes a body 52' mounted upon an arm 51 connected to a slide 40' having a spring operated plunger co-operating with the guide bar notches as described in detail above in connection with the lower guide bar. Stop collars 43 are employed preferably in connection with the guide bar also. The details of construction of the upper belt guide are preferably the same as already described, including a belt leader 57' extending upward above the pintles 53. The efficiency of either belt leader for shifting the belt from a smaller to a larger pulley step is secured by the provision of a link or brace 69 attached at one end to the belt guide body 52 or 52' and having adjustable connection at its other end through a plurality of holes 69' with one of the lips of the leader, it being understood that the leader lips embrace the near edge of the belt or the edge remote from the larger end of the respective pulley. The link or brace 69, as well as the other parts, is preferably made of pliable metal so as to adapt the several parts to various sizes or designs of equipment assuring the automatic adaptability of the belt and the shifter mechanism to the variations in angle of the belt with respect to the plane intersecting the pulley axes while the belt is being shifted from one end of the pulleys to the other.

Attached to and leading to the right from the upper slide 40' is a flexible connection or cable $a$, the same extending along the upper guide bar 35 and thence over the pulley 48' and thence upward over any suitable direction pulleys 70 to manually actuated mechanism indicated generically at 71, Fig. 1. By means of this cable $a$ the upper slide is moved toward the right, moving the belt from any larger step to the next smaller step of the pulley 33. For this purpose the belt guide 40' acts against the edge of the belt remote from the leader 57' and is quite sufficient for the purpose of drawing the belt initially to the smaller step. Attached to the lower slide 40 is another cable $b$, the same extending along the lower bar 35, thence over the pulley 48, thence returning upon itself and is then directed upward around the pulley 49 to the ceiling or other overhead support where it is guided over one of a pair of pulleys 72 and thence horizontally and down over another pulley 73 which may be journaled in the same housing as the pulley 70. Drawing on this cable $b$ moves the slide 40 along the guide bar 35 and acting through the leader 57 brings the lower loop of the belt upon the next larger step of the cone 28. As illustrated the cables *a* and *b* are drawn in succession, first to drop the upper loop of the belt from a larger to a smaller step of the upper cone and then in turn to bring the lower loop of the belt upon the next larger step of the lower cone. The operator when operating and actuating these cables by hand knows by experience when the end of each partial shift is completed by the snapping of the plunger 37 into its notch 36 with respect to each guide bar, and as intimated above the plunger then serves to hold the shifter unit at the proper place along the pulley.

Connected to the left end of the lower slide 40 is a third cable *c* which leads around a pulley 50 and thence upward over direction pulleys 74 and 75 adjacent to the ceiling and thence downward to the actuator. The purpose of this cable is to shift the belt from a larger step to a smaller step of the lower cone 28. Again, connected to the left end of the upper slide 40' is a fourth cable *d* leading upward over a pulley 49' and thence over suitably arranged direction pulleys 76 and 77 to the actuator. The purpose of this cable *d* is to shift the upper loop of the belt from a smaller step to a larger step of the upper cone.

Any suitable means may be provided for actuating the cables so as to impart to each pair thereof a successive action whereby one loop of the belt is first dropped from a larger step and then in turn the opposite loop of the belt will be shifted upon the next larger step as a result of the looseness provided by the first movement. The actuator mechanism shown in Fig. 1 comprises for each pair of cables a pair of hand grips. These grips are indicated as 78 and 79 to which the cables *a* and *b* are attached respectively and these grips are preferably closely associated, the former above the latter, so that the operator first grasping and pulling downward upon the grip 78 to draw the cable a suitable distance corresponding to the interval between steps, he may then transfer or slip his hand in an easy natural movement from the grip 78 to the grip 79 whereby he then in substantially a continuous movement of the hand will actuate the cable *b*. To provide for this close association and to insure not only the easy transfer of the hand from one grip to the other during this simple downward movement of the hand but also to insure proper correlation between the two grips as to extent of movement thereof, I provide a stem 80 for the grip 79 upon which the grip 78 is slidably fitted and guided and whereby the grips are adapted for independent movement within the limits desired. The normal space vertically between the two grips is equivalent to the interval aforesaid or distance between centers of adjacent pulley steps. From the position of the parts as shown in Fig. 1, assuming that the belt is to be shifted to the right, the operator first pulls downward on the grip 78 drawing the cable *a* until the grip 78 strikes against the grip 79, by which time the upper loop of the belt will be thrown from its original position to its loose engagement over the next lower step of the pulley 33 and the plunger 37 for the belt loop slide 40' will have been received in the next notch 36 of the bar 35 adjacent thereto. The operator appreciating this fact by the sensation on his hand will simply allow his hand to slip upon and grasp the grip 79 and give a downward pull thereon, causing the cable *b* to actuate the lower shifter unit as more fully described above. This downward pull on the grip 79 will bring an adjustable stop pin 81, fixed in any selected hole in the upper portion of the stem 80, into direct engagement with the top end of the grip 78 whereby the operator knows that he has pulled the cable far enough and by this time the lower plunger 37 will have dropped into the next notch 36 of the lower guide bar. This actuation of the grips 78 and 79 is therefore in effect a result of a single downward movement of the hand although during the movement the hand is shifted from one grip to the other.

For the cables *c* and *d* I provide another pair of hand grips 78' and 79' whose operation and correlation are the same as described in connection with the grips 78 and 79, the upper grip in each case being slidably guided along the stem 80 of the lower grip. The several holes in the upper end of the stem provide for the adjustment of the pin 81 so that the space between the two grips will be equivalent to the interval as aforesaid. For convenience the two pairs of grips are located within easy reach of the operator as he stands in front of the machine, and to keep the grips of one pair properly spaced and segregated from the grips of the other pair I provide a distance bar 82 pivoted at 83 at its ends to the upper ends of the respective grips 78 and 78'. It will be noted also that the position of each pair of grips indicates the direction in which the belt is to be shifted.

In Fig. 14 the modified form of hand grip 78ª is simply for the purpose of giving the operator a more positive hold thereon, this form being best adapted for heavy machine work where a more powerful pull is required, although in my practice of this invention I have found that the belt is easily shifted in any case. In Figs. 15 and 16 the actuator mechanism for each pair of cables comprises a casing 84 having a pull grip 85 at its lower end and within the upper end of which casing are slidably fitted a pair of hooks 86 and 87 to which the cables *a* and *b* are respectively attached above the casing. Stop collars 88 are attached to the shanks of the hooks and contact with the top end of the casing to limit the upward movement of the casing with respect to said hooks. A pair of springs 89 and 90 are connected respectively to the lower ends of said hooks at their upper ends and the lower end of the casing at their other ends. The normal tendency of these springs is to draw the casing upward, but the strength of the springs is not much superior to the weight of the casing. In the normal position of the parts the hook 86 co-operates with a shoulder 91 formed in the adjacent side of the casing whereby when the casing is drawn downward for pulling the cable $a$ the hook 86 and the cable will be drawn downward as desired. The hook 87 however being connected to the casing only through the light spring 90 will not be drawn until the desired interval of movement of the casing has taken place, at which time a lug 92 formed on the inside of the casing will engage the hook 87 and so while the casing is drawn downward with a continuous pull the hooks will be operated one after the other for their respective intervals. At the time the lug 92 becomes effective to move the hook 87 and cable $b$ the lower free point or end of the hook 86 will have wiped against the inwardly and upwardly projecting free end of the hook 87 causing the release of the hook 86 from its shoulder 91, thereby permitting the hook 86 and cable $a$ to remain stationary while the casing continues on its downward movement, the spring 89 being light enough to permit this action. When however the casing has been drawn downward for the second interval and then released the springs 89 and 90 will restore the casing to the relative position shown in Fig. 15. This form of the invention is particularly useful and efficient in making shifts from one step to another and then resting. If however the belt is to be shifted from one end of the pulley to the other the same device may be employed, for it is only necessary for the operator to allow the casing to go back to normal position at the end of each step shift.

I claim:

1. In a belt shifter of the character set forth, the combination with a pair of pulleys and a belt operating thereover, of shifter units co-operating with the belt adjacent to the respective pulleys, hand grip devices remote from the belt and located for movement in the same direction and in the same line, and cables extending from the belt shifter units to the respective hand grip devices, said grip devices constituting means for operating positively the cables independently of each other and in succession as a result of a single movement of the operator's hand in a single direction.

2. In a belt shifter for cone pulleys, the combination with the cone pulleys and a belt operating over them, of a shifter unit embracing the belt adjacent to each pulley, means to support and guide each shifter unit, actuator mechanism remote from the pulleys, and independent flexible connections between the actuator mechanism and the several shifter units, the actuator mechanism comprising two pairs of hand grips, one pair for shifting the belt to the right and the other pair for shifting it to the left, the two hand grips of each pair being arranged for successive actuation independently of each other but with a continuous simple movement of the hand.

3. Actuator mechanism for belt shifters comprising a pair of cables, a hand grip attached to the end of each cable and direct connecting means between the grips to cause one of the grips to slide in definite relation to the other hand grip and thus to independently actuate the cables.

4. Actuator mechanism for belt shifters comprising a pair of cables, a hand grip attached to the end of each cable and means to cause one of the grips to slide in definite relation to the other hand grip, one of the hand grips comprising guiding means and the other hand grip arranged for sliding movement along said guiding means.

5. Mechanism as set forth in claim 3 in which one of the hand grips is provided with a rigid stem while the other hand grip is mounted upon said stem and is slidable along the stem to an extent equivalent to the interval of shifting action.

6. Actuator mechanism for belt shifters comprising two pairs of hand grips, the grips of each pair being closely associated with each other and movable relatively longitudinally, a pair of cables attached to each pair of hand grips, and spacer means extending from one pair of hand grips to another.

7. Actuator mechanism for belt shifters comprising two pairs of hand members, the upper member of each pair being guided for movement lengthwise of the other member, cables connected to the hand members for independent actuation, and a rigid spacer member extending between and pivotally connected to the upper ends of each pair.

8. Actuator mechanism for belt shifters comprising a pair of hand members, means on one member to guide the other member for relative longitudinal movement between them, a pair of cables connected to the respective hand members, and means to limit the extent of movement of each of said hand members with respect to the other.

9. In a belt shifter of the character set forth, the combination of a shifter unit comprising a member embracing the belt, a hand member located remote from the belt for moving the shifter unit in one direction, means remote from the belt for moving it in the other direction, flexible connections between said remote hand members and the shifter unit, and spacing means connected to said remote hand members for holding the same in definite relation to each other for easy identification and manipulation thereof respectively.

10. Actuator mechanism for belt shifters for cone pulleys comprising two pairs of hand members, the upper member of each pair being guided for movement lengthwise of the other member, cables connected to the hand members for independent actuation, a rigid spacer member extending between and movably connected to the upper members of each pair, and means to adjust the length of the spacer member according to the width of the pulleys.

11. Mechanism as set forth in claim 8 including a belt guide, a bar having a plurality of series of notches therein, the notches of each series corresponding to the several intervals of cone steps, while the intervals between the notches of the several series differ according to the different cone step intervals, and a spring operated member carried by the belt guide co-operating in succession with said notches.

12. In a belt shifter for cone pulleys, the combination with a pair of cone pulleys, a belt operating thereover, and a shifter unit for the belt adjacent to each pulley, of a guide bar for each unit, said bar being of flat construction having formed along one face thereof a plurality of series of notches, the series being parallel to one another and at varying distances from the edges of the bar and the notches of each series being differently spaced from those of other series, the notches of each series being spaced from one another according to standard step intervals of the pulleys, and automatic stop mechanism carried by the shifter unit movable along said bar for co-operation with the desired series of notches.

13. Mechanism as set forth in claim 12 in which the automatic stop mechanism is adjustable transversely of the unit for selective co-operation with that series of notches pertaining to the standard step intervals of the pulleys.

14. Mechanism as set forth in claim 12 in which each guide bar is provided with a series of notches each having flat sides and the belt guide co-operating therewith is provided with a catch member receivable in the successive notches for holding the guide in operative position but is relatively easily moved thereover by reason of said flat sides, said catch member having a flat V-shaped point for co-operation with said notches.

15. In a belt shifter for cone pulleys, the combination of a guide member, a belt guide movable therealong from one end of the pulley to the other, said belt guide comprising a body surrounding the belt and a belt leader connected to said body and having means embracing the rear edge of the belt for forcing the belt from a smaller step to a larger step.

16. Mechanism as set forth in claim 15 in which the belt guide comprises anti-friction members on opposite sides of the belt, means along the edge of the belt for moving the belt from a larger to a smaller step, and means along the opposite edge of the belt and extending lengthwise of the belt from said body for forcing the belt from a smaller step to a larger step, said last mentioned means being adjustable to vary the angle from the plane of the body according to the approximate direction of movement of the belt.

17. Mechanism as set forth in claim 15 in which the leader member is provided for engaging and acting upon the rear edge of the belt for forcing the belt from a smaller step to a larger step, said leader being adjustable relative to the plane of the body of the belt guide according to the direction of movement of the belt, and bracing means between the leader and that portion of the body remote therefrom.

18. Mechanism as set forth in claim 15 in which the leader member is provided for embracing one edge of the belt, said leader member having a body with two concentric arcuate slots, and the belt guide body includes a pair of pintles projecting through said slots and around which the belt guide is movable to vary the angle with respect to the plane of said pintles, and means to clamp the leader in fixed position with respect to the belt guide body.

19. In a belt shifter for cone pulleys, the combination of a guide bar, a slide movable along the same from one end to the other, a belt guide adjacent to the slide for embracing the belt and shifting the same in either direction, and means serving to connect the guide to the slide for positive movement of the former with the latter lengthwise of the bar, said connecting means including an arm fixed to the slide and extending laterally at a right angle therefrom and having transverse free slidable engagement with the guide, the arm and slide thereon being movable lengthwise of the pulley at a slight angle to the axis of the pulley, and said arm being bent intermediate of its ends so that the free end thereof on which the belt guide is freely slidable lies in a plane perpendicular to the axis of the pulley.

20. In a belt shifter of the class set forth, the combination of a guide bar, a slide movable along the same, said guide bar being provided with a plurality of parallel series of notches, the notches of each series being equally spaced but spaced differently from the notches of other series adapting the bar for use in connection with various pulleys of correspondingly varying intervals, a slide movable along the bar, belt shifter means connected to the slide, and stop means carried by the slide and co-operating selectively with the notches of any series.

21. Mechanism as set forth in claim 20 in which the stop means carried by the slide includes a plunger adjustable transversely of the slide to bring the point thereof into registry with any selected series of notches.

22. Mechanism as set forth in claim 20 in which the catch means comprises a spring pressed plunger and a housing therefor having a T-head adjustable transversely of the slide along a similarly formed groove, and means to lock the housing after being adjusted.

23. Mechanism as set forth in claim 15 including means for adjusting the belt leader toward or from the belt guide body and for fastening it in adjusted position according to variations in width of belts.

24. In a belt shifter for cone pulleys, the combination with a pair of cone pulleys, a belt operating thereover, and a shifter unit for the belt adjacent to each pulley, of a guide bar for each unit, said bar being of flat construction having formed along one flat face thereof a series of notches spaced from one another according to the cone step intervals, the notches being provided with flat sides, and automatic stop mechanism carried by the shifter unit movable along said bar, said stop mechanism including a plunger adapted to snap in succession into the notches, the point of the plunger being V-shaped for easy co-operation with the respective notches and yet capable of delicate adjustment as to position of the shifter unit.

25. Actuator mechanism for belt shifters comprising a pair of hand members, one member having a guide stem extending therefrom, said stem being provided with a series of holes, the other hand member having a longitudinal bore through which the stem aforesaid projects, a pin engageable selectively in one of said stem holes to variably determine the normal gap or interval between the two hand members, and a pair of cables connected to the hand members.

In testimony whereof I affix my signature.

NILS E. GOOD ACTIVE.